May 5, 1942.   W. F. PECK ET AL   2,281,711
SPEED GOVERNOR FOR ELECTRIC MOTORS
Filed June 8, 1939   3 Sheets-Sheet 1
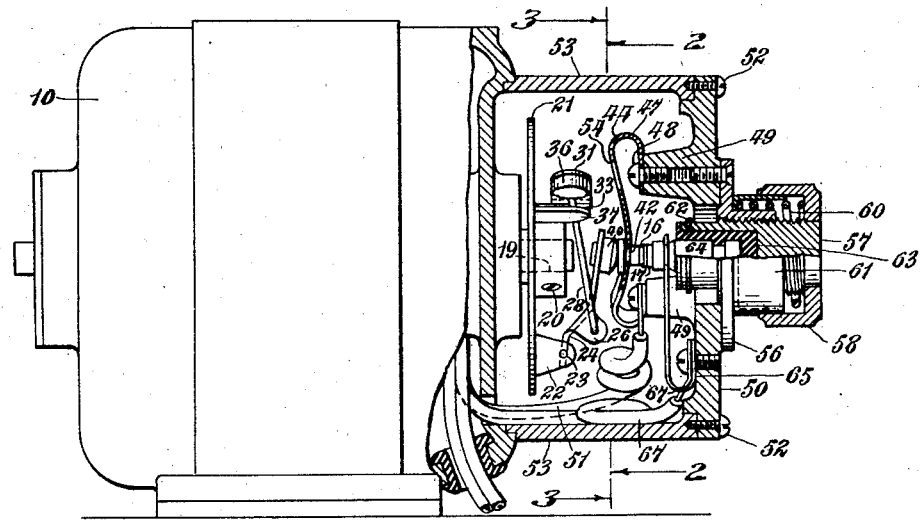
Fig. 1.
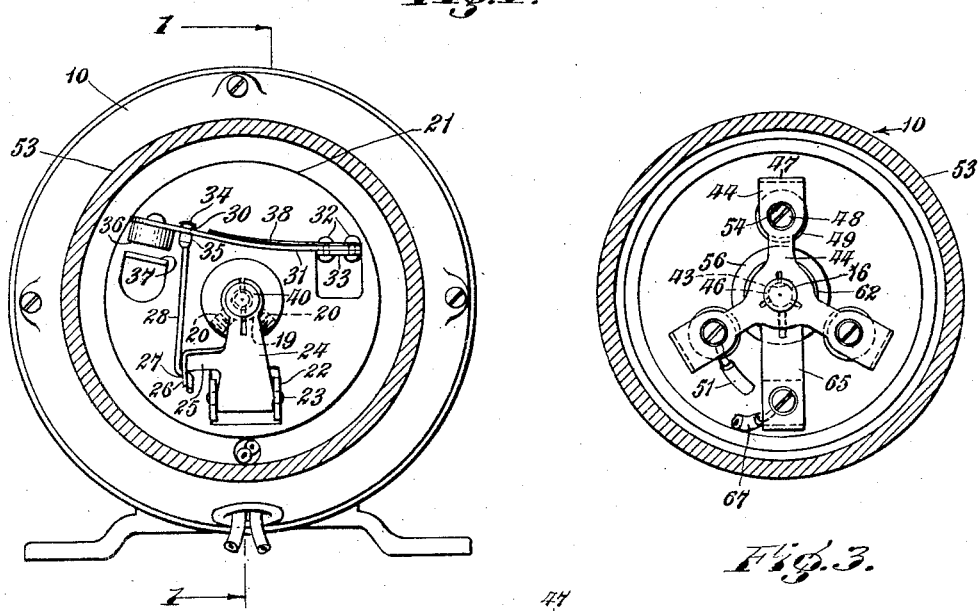
Fig. 2.
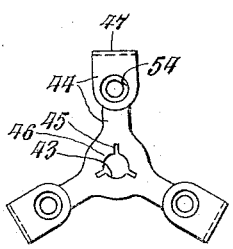
Fig. 3.
Fig. 4.
INVENTORS
William F. Peck
and
Charles M. Sperazz
BY
Walter H. Popp
ATTORNEY May 5, 1942. W. F. PECK ET AL 2,281,711

SPEED GOVERNOR FOR ELECTRIC MOTORS

Filed June 8, 1939 3 Sheets-Sheet 2

INVENTORS
William F. Peck
and
Charles M. Sperazz
BY
Walter H. Popp
ATTORNEY

May 5, 1942.  W. F. PECK ET AL  2,281,711
SPEED GOVERNOR FOR ELECTRIC MOTORS
Filed June 8, 1939  3 Sheets—Sheet 3

INVENTORS
William F. Peck
and
Charles M. Sperazz
BY
Walter H. Popp
ATTORNEY

Patented May 5, 1942

2,281,711

UNITED STATES PATENT OFFICE 2,281,711

SPEED GOVERNOR FOR ELECTRIC MOTORS

William F. Peck and Charles M. Sperazz, Kenmore, N. Y., assignors to Spencer Lens Company, Buffalo, N. Y., a corporation of New York Application June 8, 1939, Serial No. 278,092

4 Claims. (Cl. 200—80)

This invention relates to a governor for maintaining the speed of an electric motor constant at whatever speed may be desired.

The general object of the invention is to provide an inexpensive speed governor which will possess a maximum of reliability and will hold the speed of the motor constant within very narrow limits.

One of the specific objects of the invention is to eliminate the need of brushes in a governor of this type. Another specific object of the invention is to provide a governor of this type in which are incorporated electric contact points whose operating faces will lie in parallel planes under all operating conditions. Still another specific object of the invention is to provide a construction of speed governor which will permit of being readily assembled and disassembled.

Numerous other objects of the invention and practical solutions thereof are disclosed in detail in the herein patent specification wherein, in the accompanying drawings:

Fig. 1 is a side elevation, partly in section, of an electric motor equipped with our improved speed governor.

Figs. 2 and 3 are vertical transverse sections thereof taken on correspondingly numbered lines of Fig. 1.

Fig. 4 is a detached end elevation of the spider which supports the regulating contact.

Similar characters of reference indicate like parts throughout the several figures of the drawings.

Figure 7:
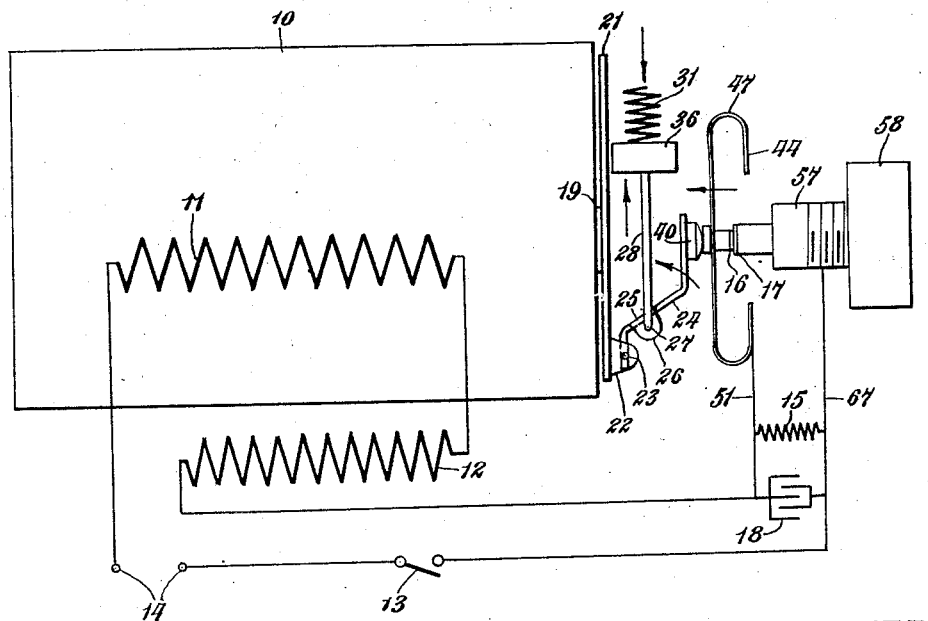
Fig. 7 is a schematic wiring diagram of the motor with the present improved speed control attached thereto.

The numeral 10 indicates a conventional electric motor which may be wound in any desired manner as, for instance, that shown diagrammatically in Fig. 7 which shows a series wound type of motor with the armature 11 connected in series with the field 12. Whenever the main control switch 13 is closed the electric current passes from the line 14 in series through said armature 11 and field 12 and through a fixed shunt resistance 15. Arranged in parallel across said shunt resistance 15 is a pair of contacts 16 and 17 and the usual accompanying condenser 18. When these contacts are closed (as shown in the drawings) said shunt resistance 15 is close circuited and the full line voltage is impressed upon the motor armature and field. This condition obtains when the motor is operating under maximum power. The condition which obtains, on the other hand, when the contacts 16, 17 are open corresponds to the lowest current input into the motor. Between these two extremes the amount of current which is fed to the motor is a function of the length of time the contacts 16, 17 are closed.

The present invention consists entirely of the control of these contacts 16, 17, and consists more particularly of an improved form of control which is a direct function of the speed of the motor. In addition to this, the arrangement is such that this control is a function of whatever particular speed may be desired by the operator. The mechanism whereby these results are obtained is constructed as follows:

Secured to the shaft 19 of the motor by means of set screws 20 or otherwise is a disc shaped, rotating head 21. Adjacent the periphery of said head rotating at the one side thereof the metal is punched and bent outwardly to form a pair of pivot ears 22, 22 to which is fulcrumed at 23 a switch actuating lever or member 24 which is preferably formed of sheet metal as shown. At one side of said lever 24 is integrally formed a lateral extension 25 whose extreme outer end is bent to form a lip 26 having a pivot hole 27 which pivotally receives the one end of a link 28. This pivotal connection between said link 28 and the pivot hole 27 of the lip 26 is preferably effected by giving the outer end of said link an S bend so that it may be readily inserted into the pivot hole 27 during the assembly operation and yet be positively prevented from becoming disengaged in service.

The other end of said link 28 is connected by a simple form of ball and socket joint 30 with the free end of a resilient arm 31 which is constructed preferably of sheet material, as shown, and is secured at its dead end, by rivets 32 or otherwise, to a bracket 33 which is struck out from the body of the rotating head 21. Said ball and socket joint is made by forming a head 34 at the outer end of the link 28 to bear against the outer face of said resilient arm 31 and then soldering a tubular thrust sleeve 35 to said link adjacent the inner face of said resilient arm.

To the extremity of the free end of said resilient arm is secured a centrifugal weight 36 and the arm itself is so constructed and arranged as at all times to resiliently urge said centrifugal weight toward a stop 37 which is struck out from the body of the rotating head 21. To permit the resilient arm 31 to operate over a relatively large field of movement without unduly changing the force of its resilient resistance the same is preferably rendered "soft" in its action by the employment of a backing spring 38 which is secured to the bracket 33 by the same rivets 32 that secure the dead end of the resilient arm 31 to said bracket.

The inner end of the actuating lever 24 is provided with a round headed button 40 which is substantially coaxial with the axis of the shaft 19 of the motor and is preferably constructed of some such non-conducting material as fiber. This button is normally urged resiliently outwardly against the aforementioned regulating electric contact 16 under the resilient influence of the resilient arm 31 and its backing spring 38. This regulating contact 16 has a reduced annular neck 42 which is received within an annular hole 43 formed coaxially at the center of a three legged, resilient, spider 44. To enable said contact to be assembled in position in the spider, the latter is provided with a number of short radial slits 45 which open into the hole 43 and provide what are in effect a number of radially inwardly projecting tongues 46 which flex resiliently when the regulating contact 16 is being pushed into place thereby permitting the effective diameter of the hole 43 to be momentarily increased until the contact 16 has moved far enough outwardly to enable the resilient tongues 46 of the spider 44 to register with the reduced neck 42 of said contact. Thereupon, said resilient tongues 46 snap into said reduced neck 42 and firmly restrain any movement thereafter of said contact 16 relatively to the spider 44. To reduce the electrical resistance between said contact 16 and the spider 44 the two may be bonded together with solder if desired. The outer end of each of the three legs of the spider 44 is given a reverse curl at 47 and is secured by a companion cap screw 48 to a companion anchor post 49 which is integrally formed on the inner face of a cap 50. One of these cap screws 48 additionally serves to electrically connect the spider with the electric lead wire 51. The cap 50 is preferably constructed of some non-conducting material such as "Bakelite" and is secured by cap screws 52 to the tubular extension 53 of the main body of the motor 10. The fact that the outer ends of the legs of the spider 44 are given a reverse curl permits the regulating contact 16 to be moved longitudinally a considerable distance and yet always be constrained to move in a strictly translatory manner, preferably, though not necessarily, parallel to the axis of the motor 10. To permit a screw driver to conveniently reach in to turn the cap screws 48, each leg of the spider 44 is punched or otherwise formed to provide an access opening 54.

Secured coaxially to the outer face of the cap 50 by cap screws 55 or otherwise is a flanged collar 56 having an internal screw thread which receives the external screw thread of a speed regulating head 57. The latter is adapted to be actuated manually by a knurled adjusting sleeve 58 which is press fitted or otherwise suitably secured thereto. To impose a frictional resistance against any accidental change of adjustment of said regulating head 51, and, at the same time, to take up any backlash in the threaded connection between said regualting head and the collar 56, a helical compression spring 60 is provided, which encircles the speed regulating head 57 and is disposed longitudinally between its adjusting sleeve 58 and the collar 56. For the sake of neat appearance and to keep dirt out of the spring 60 it is encased in a tubular casing 61 which is inwardly flanged at its inner end so as to be firmly pressed at all times by said spring 60 against the outer face of the flanged collar 56. To prevent the regulating head 57 from being screwed outwardly an undue amount its inner end is provided with an external annular groove which is adapted to receive a resilient split limiting ring 62. Thus, when the regulating head 57 has been screwed out to the limit of its desired outward movement this split limiting ring 62 strikes against the inner face of the flanged collar 56 and prevents any further unscrewing of said regulating head. If desired the adjusting sleeve 58 may be provided with some suitable form of scale so as to be able to set it at any certain predetermined point.

The inner end of said regulating head 57 is axially bored out and within this bored out portion, but separated from said regulating head 57 by a tubular installation 63, is an adjusting stud 64. To the extreme inner end of this stud is soldered or otherwise secured aforedescribed adjusting contact 17, the inner face of which is always maintained parallel to the juxtaposed face of the regulating contact 16 by reason of the fact that the axis of rotation of said adjusting contact 17 is always maintained coincident with or parallel to the axis of the regulating contact 16.

To connect the adjusting contact 17 with the rest of the external electrical system without preventing rotation of said adjusting contact or its regulating head 57, a resilient current-conveying arm 65 is employed, the outer end of which is of U shape at 66 to embrace a suitable reduced neck which is formed on the inner end of the adjusting stud 64. The outer end of this current-conveying arm 65 is given a reverse curl at 67 and is secured to the inner face of the cap 50, and is, at the same time, electrically connected with the electric lead wire 67.

OPERATION

When the operator desires the motor 10 to rotate at a certain constant low speed he unscrews the adjusting sleeve 58 to some such position as that shown in Figs. 1–3 incl. Assuming that the main motor switch 13 is closed and that the motor 10 has not yet come up to speed, the force of the resilient arm 31, pushes the centrifugal weight 36 inward and the actuating lever 24 and its fiber button 40 outward. The latter pushes the regulating contact 16 outward against the relatively small resilient resistance of the spider 44 so as to cause said regulating contact to bear against the adjusting contact 17. This close circuits the shunt resistance 15 and causes the maximum amount of current to pass through the armature 11 and field 12 of the motor 10. This causes the speed of the motor to increase until the centrifugal force of the centrifugal weight 36 overcomes the resilient force of its resilient arm 31, whereupon the fiber button recedes and the relatively feeble resilient force of the spider 44 is enabled to move the regulating contact 16 away from the adjusting contact 17. This opening of the contact causes only such current to pass through the motor as is able to pass through the shunt resistance 15. Thus the speed of the motor decreases until the centrifugal force of the centrifugal weight 36 drops sufficiently to again close the circuit through the contacts 16 and 17 and again speed up the motor. In actual practice the balancing of the various forces is so delicate that when the motor has once come up to speed it maintains this speed with no appreciable change under all conditions of load change or voltage variation. It should be noticed in this connection that the resilient force of the relatively weak spider 44 is opposed to that of the resilient arm 31, this being one of the numerous reasons why the control of the present improved speed regulator is so very delicate and yet positive.

Figure 5:
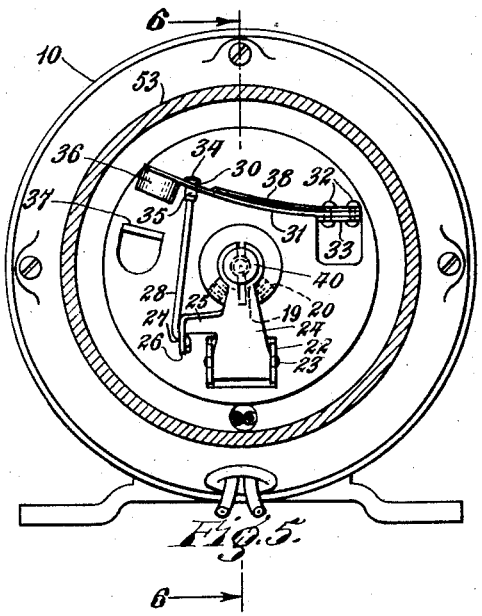
Fig. 5 is a vertical transverse section through the motor taken on line 5—5 Fig. 6, showing the position of the parts on the motor when the same is operating at a higher speed than that shown in Figs. 1–3.
Figure 6:
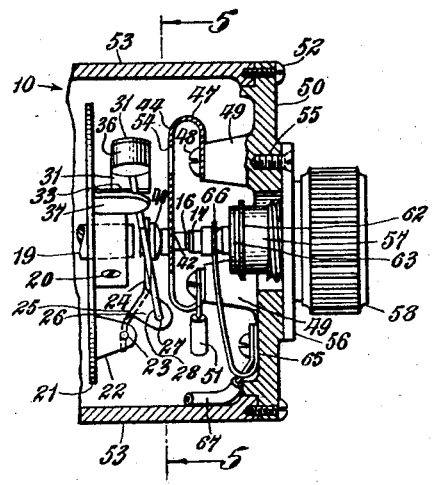
Fig. 6 is a fragmentary vertical longitudinal section thereof taken on line 6—6 Fig. 5.

If the operator now wishes to have the motor rotate at a higher constant speed he screws in the adjusting contact 17 to some such position as that shown in Figs. 5 and 6. In this position the spring arm 31 is under greater tension and hence a higher rotative speed is required before the centrifugal force of the centrifugal weight 36 is able to overcome the resilient resistance of the spring arm 41.

When the operator wishes to disassemble the governor he unscrews the cap screws 52 and removes the cap 50 together with its appurtenances. In this position the spring arm 31 is prevented from moving inwardly an inordinate amount by reason of the stop 37 so that, when the operator desires to reassemble the parts, the fiber button 40 is not able to be swung so far laterally as to miss making contact with the inner face of the regulating contact 16.

Figure 8:
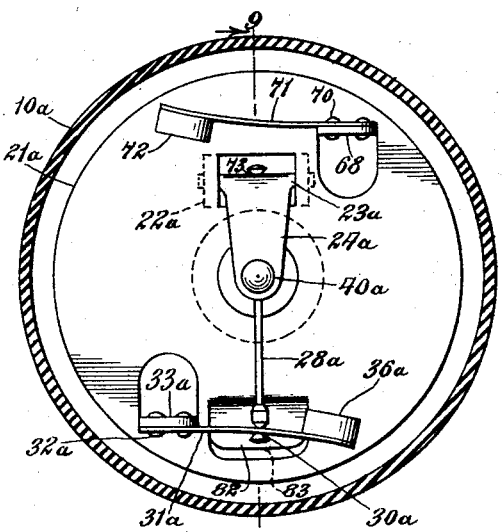
Fig. 8 is a vertical transverse section through a modified form of the invention, taken on line 8—8 Fig. 9.
Figure 9:
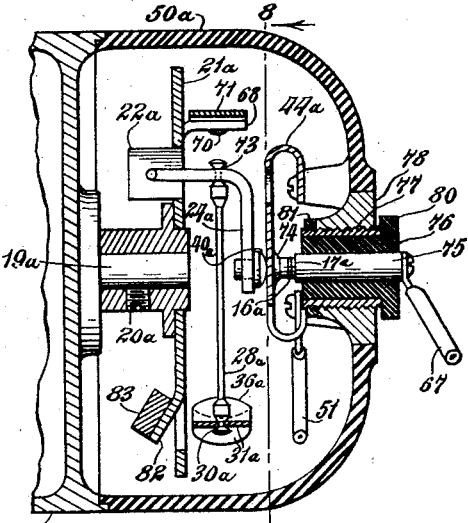
Fig. 9 is a fragmentary vertical longitudinal section thereof taken on line 9—9 Fig. 8.

*Figs. 8 and 9*

In these figures is shown a modified form of the invention which is constructed as follows: Secured to the shaft 19a of the motor 18a by means of a set screw 20a or otherwise is a rotating head 21a having a pair of punched and outwardly bent, symmetrically disposed brackets 33a and 68. To these brackets are secured by means of rivets 32a and 70 a symetrically disposed pair of resilient arms 31a and 71 to the outer ends of which are secured a centrifugal weight 36a and a balancing weight 72. The former is so arranged as to control the speed of the motor, while the function of the latter is to move to such an outward or inward position as will effect an exact centrifugal dynamic balancing of the centrifugal weight 36a and its appurtenances at every speed of rotation of the motor.

Connected by a ball and socket joint 30a to the central part of the resilient arm 31a is a link 28a whose upper end is conected by a ball and socket joint 73 to the central part of a bell-crank-shaped actuating member 24a. The latter is pivoted at 23a to a pair of pivot ears 22a which are punched and bent rearwardly from the main body of the rotating head 21a. To the inner end of the actuating member 24a is secured a round headed button 40a which is preferably constructed of fiber or like material. The outer spherical face of this button bears against the inner flat transverse face of a spider 44a. Secured coaxially to the outer face of said spider by means of solder 74 or otherwise is a regulating contact 16a which is adapted to make contact with the adjusting contact 17a under the influence of the resilient arm 31a and against the influence of the centrifugal weight 36a and the relatively light resilience of the spider 44a. The contacts 16a and 17a are electrically connected to the electric wires 51 and 67 in a manner similar to that shown in Figs. 1–7.

In a manner previously described in connection with said Figs. 1–7, as the motor speeds up the centrifugal force of the centrifugal weight 36a becomes sufficient to slightly retract the button 40a, whereupon the resilience of the spider 44a draws the regulating contact 16a away from the adjusting contact 17a. This opens the circuit and causes the speed of the motor to drop until the centrifugal force of the centrifugal weight 36a is insufficient to overcome the centripedal force of the resilient arm 31a, whereupon the contacts 16a, 17a are closed and the motor caused to speed up and the same cycle of operations repeated. The variation in the speed of the motor in actual practice, as previously described, is infinitesimal.

The adjusting contact 17a is soldered or otherwise secured to the inner end of an adjusting rod 75 which is firmly molded in or otherwise secured to the central part of an insulating bushing 76, which latter, in turn, is molded in or otherwise secured to the central part of a metal bushing 77. The periphery of the latter is exteriorly threaded into the internally threaded bore of a metal sleeve 78 which latter is molded in or otherwise secured to the central part of the motor cap 50a which is preferably constructed of some such electric insulating material as hard rubber.

The outer end of the insulating bushing 76 is provided with an annular flange 80 so as to be conveniently grasped by the fingers of the operator. When the operator turns this flange 80 in the one or other direction the adjusting contact 17a is caused to be moved inwardly or outwardly and to thereby cause the motor to rotate at whatever constant speed may be desired. When the proper adjustment of speed has been obtained the adjustment is locked in place by a lock nut 81 which is threaded onto the exterior threads of the metal bushing 77 and is adapted to jam against the vertical inner face of the metal sleeve 78.

Punched and bent obliquely inwardly from the rotating head 21a is a static balancing lip 82 to which is secured a static balancing weight 83. The latter is adapted to statically balance the weight of the pivot ears 22a and the actuating member 24a and its appurtenances. The particular feature of this construction is that the effectiveness of this static balancing weight 83 may be adjusted by merely bending the lip 82 inwardly or outwardly as may be desired. If a very great adjustment of effectiveness is desired the weight 83 may have part of its stock removed by a drilling operation or increased in weight by a soldering operation in the usual and well known manner.

Figure 10:
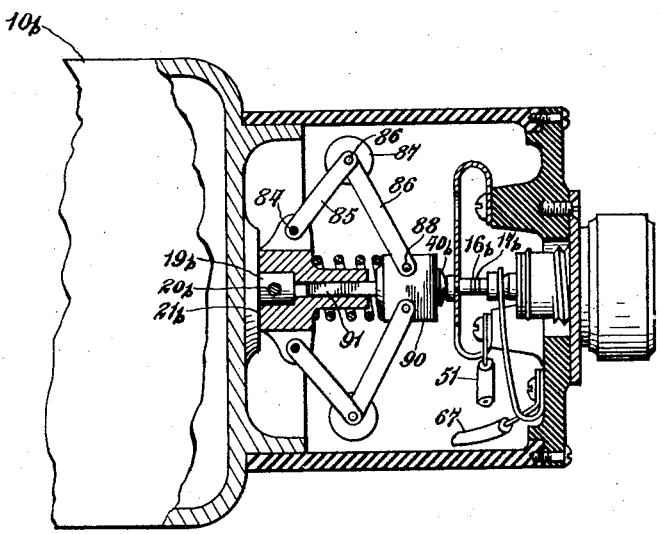
Fig. 10 is a fragmentary vertical longitudinal section through still another modified form of the invention.

*Fig. 10*

In this construction is shown a modified means of controlling the movement of the regulating contact 16b. This construction is as follows: Secured to the shaft 19b of the motor 18b by means of a pin 20b or otherwise is a rotating head 21b to which at opposite sides is pivoted at 84 a pair of fly-ball links 85. Each of the latter is pivoted by a pivot pin 86 to a companion draw link 86. Connected with each of said pivot pins 86 or otherwise suitably connected with the outer end of each companion pair of links 85, 86 is a fly-ball weight 87.

The inner ends of the draw links 86 are pivoted at 88 to the opposite sides of a slide head 90 which is slidably mounted at the outer end of the rotating head 21b but prevented from rotating with respect thereto by the provision of some such suitable means as the square shank 91 illustrated. In the outer end of this slide head 90 is arranged a fiber button 40b which actuates the contacts 16b and 17b and controls the flow of current through the electric lead wires 51 and 67 in a manner similar to that previously described.

While only a few embodiments of the invention have been shown in the present application it is to be understood that the scope of the invention is not to be limited to the particular constructions herein disclosed but is only to be limited by the scope of the appended claims.

We claim:

1. In a speed control device for electric motors the combination of a rotatable support, a lever pivotally mounted on the face of said rotatable support, a centrifugal member having a resilient arm mounted at one end on the face of said rotatable plate and adjacent the periphery thereof and having a weight adjacent its free end, said arm being normally under tension to retain the circuit closed, said centrifugal member being adapted to counter-act said resilient arm and actuate said pivotal lever to open the circuit until the centrifugal force is less than the force of said resilient arm, whereby the resilient arm will again actuate said pivotal lever to close the circuit, and a switch actuating portion on said pivotal lever having a contacting surface, a spider translation member having looped end portions connected to the frame and having a contact portion adapted to be moved longitudinally by engagement with said contacting surface of said pivotal lever, a speed regulating member on the frame, and a member having a contact positioned between said translation member and said speed regulating member.

2. In a speed control device for electric motors the combination of a rotatable support, a lever pivotally mounted on the face of said rotatable support, a centrifugal member having a resilient arm mounted at one end on the face of said rotatable plate and adjacent the periphery thereof and having a weight adjacent its free end, said arm being normally under tension to retain the circuit closed, said centrifugal member being adapted to counter-act said resilient arm and actuate said pivotal lever to open the circuit until the centrifugal force is less than the force of said resilient arm, whereby the resilient arm will again actuate said pivotal lever to close the circuit, and a switch actuating portion on said pivotal lever having a contacting surface, a spider translation member connected to the frame and having a central contact portion adapted to be moved longitudinally by engagement with said contacting surface of said pivotal lever, a speed regulating member on the frame, and a member having a contact positioned between said translation member and said speed regulating member.

3. In a speed control device for electric motors the combination of a rotatable support, a lever pivotally mounted on the face of said rotatable support, a centrifugal member having a resilient arm mounted at one end on the face of said rotatable plate and adjacent the periphery thereof and having a weight adjacent its free end, said arm being normally under tension to retain the circuit closed, said centrifugal member being adapted to counteract said resilient arm and actuate said pivotal lever to open the circuit until the centrifugal force is less than the force of said resilient arm, whereby the resilient arm will again actuate said pivotal lever to close the circuit, and a switch actuating portion on said pivotal lever having a contacting surface, a translation member connected to the frame and having a contact portion adapted to be moved longitudinally by engagement with said contacting surface of said pivotal lever, a stud member on the frame and a member having a contact positioned between said translation member and said contact member on the frame.

4. In a speed control device for electric motors the combination of a rotatable support, a lever pivotally mounted on the face of said rotatable support, a centrifugal member having a resilient arm mounted at one end on the face of said rotatable plate and adjacent the periphery thereof and having a weight adjacent its free end, said arm being normally under tension to retain the circuit closed, said centrifugal member being adapted to counteract said resilient arm and actuate said pivotal lever to open the circuit until the centrifugal force is less than the force of said resilient arm, whereby the resilient arm will again actuate said pivotal lever to close the circuit, and a switch actuating portion on said pivotal lever having a contacting surface, a spider translation member connected to the frame and having a contact portion adapted to be moved longitudinally by engagement with said contacting surface of said pivotal lever, a stud member on the frame and a member having a contact positioned between said spider translation member and said contact member on the frame.

WILLIAM F. PECK.
CHARLES M. SPERAZZ.